July 9, 1963　　　G. J. LABBE ETAL　　　3,096,803
TIRE CHAIN

Filed May 17, 1961　　　　　　　　　　　　　　2 Sheets-Sheet 1

GILBERT J. LABBE
ROY J. LABBE
INVENTORS

BY *Walter G. Finch*
ATTORNEY

July 9, 1963
G. J. LABBE ETAL
3,096,803
TIRE CHAIN
Filed May 17, 1961
2 Sheets-Sheet 2
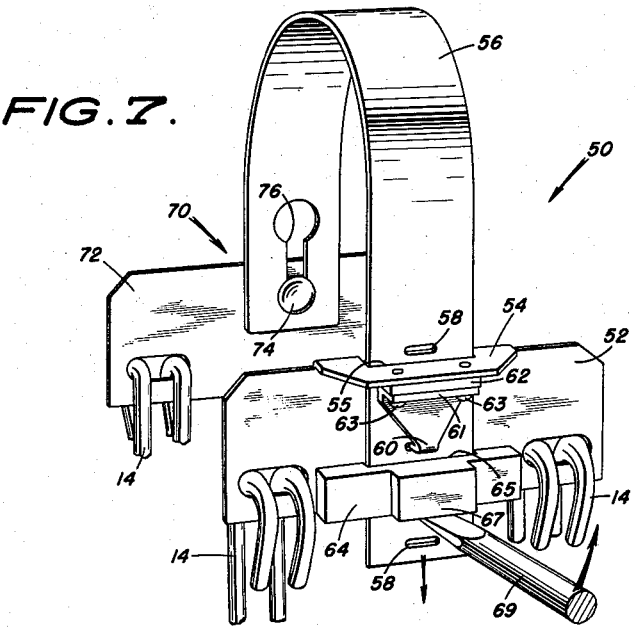
FIG. 7.
FIG. 8.
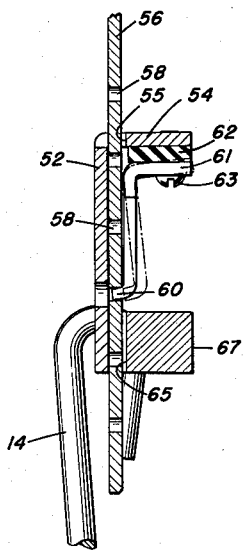
GILBERT J. LABBE
ROY J. LABBE
INVENTORS
BY *Walter G. Finch*
ATTORNEY

United States Patent Office 3,096,803
Patented July 9, 1963

3,096,803
TIRE CHAIN
Gilbert J. Labbe and Roy J. Labbe, both of
548 Wyanoke Ave., Baltimore 18, Md.
Filed May 17, 1961, Ser. No. 110,727
6 Claims. (Cl. 152—237)

This invention relates generally to wheel traction devices and more particularly it pertains to an improved clip-on strap and tensioning device for emergency tire chains.

The attachment of full tire chains is generally a difficult operation especially under emergency conditions. For this purpose, partial chains have been developed and used with fair success in the past. However, the usual strap attachment of such partial chains has left much to be desired in ease of attachment and serviceability under any but short time usage.

Accordingly, it is an object of the present invention to provide an improved emergency type partial tire chain which is easily attached to a vehicle wheel and which is readily tensioned for long continuous and rugged service.

Another object of this invention is to provide a simple strap clamping arrangement for an emergency tire chain which is positive-holding, self tension-compensating, and which can be adjusted readily from either side of the automobile wheel.

Still another object of this invention is to provide a novel ratchet type tensioning buckle for receiving cross chains on a vehicle wheel.

These and other objects and advantages of this invention will become more readily apparent and understood from the following detailed specification and accompanying drawings in which:

FIG. 7 is a perspective veiw of a second embodiment of the improved emergency tire chain; and FIG. 8 is a vertical section, much enlarged, taken through the center of the ratchet structure of the second embodiment.

Figure 1:
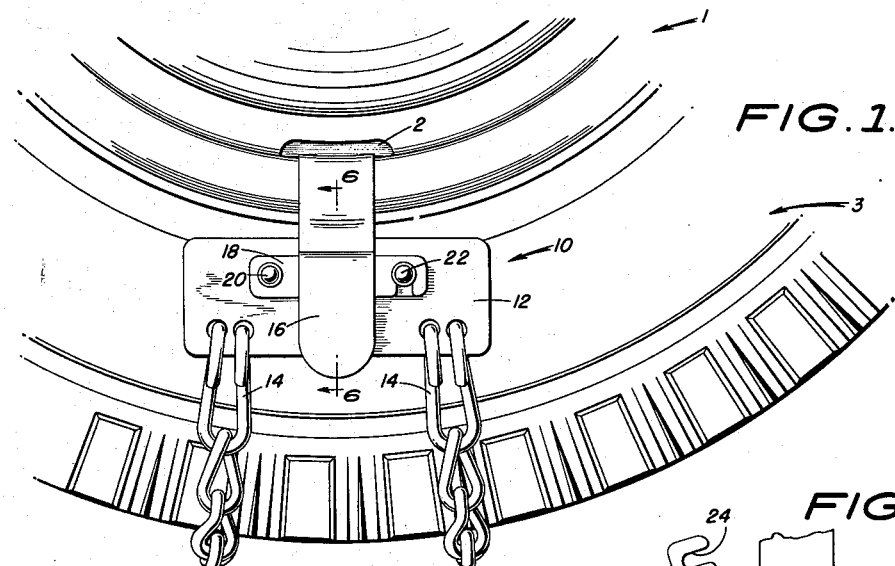
FIG. 1 is a side view of one embodiment of a wheel-mounted emergency tire chain incorporating features of this invention.

In one exemplary embodiment of the invention as disclosed in FIGS. 1 through 6 of the drawings, an emergency chain assembly 10 is shown which consists of an end block or base plate 12 which is joined at one long edge by means of a pair of spaced cross chains 14 to the long edge of another plate identical to base plate 12 (not shown).

Each base plate 12 is provided with a lock plate 26 spaced therefrom on a pair of rivets 20 and 22 and located symmetrically between the points of attachment of cross chains 14. A latch 18 is spaced outwardly from the lock plate 26 and arranged to pivot at one end on rivet 20 and to engage the extending end of the other rivet 22 with its hooked end 24.

Figure 2:
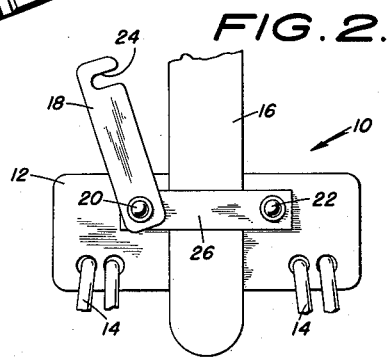
FIG. 2 is a detail side elevation of the base plate for the tire chain illustrated in FIG. 1 showing the first step in securing the strap end thereto.
Figure 3:
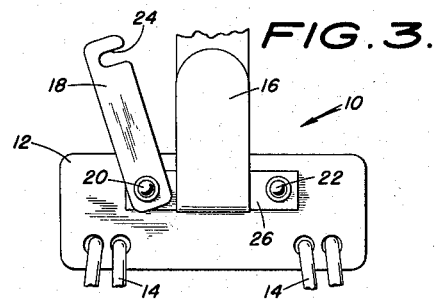
FIG. 3 is a view similar to FIG. 2 showing the next step in the securement of the strap.
Figure 5:
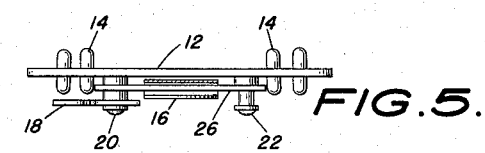
FIG. 5 is a top view of the base plate as shown in the step illustrated in FIG. 3.

In use, a long flat flexible strap 16, preferably of thin mild steel, is inserted through the usual aperture 2 in the felloe of a vehicle wheel 1 and brought down along each side of the tire 3. The spaced chains 14 are placed across the tread of the tire 3 and the ends of strap 16 are inserted under the lock plate 26 of each base plate 12 as shown in FIG. 2. The cross chains 14 are drawn tightly upwardly against the tire 3 and the strap 16 tightly downwardly against the felloe of wheel 1 and then each end of the strap 16 is bent sharply upward with the latch 18 open as shown in FIGS. 3 and 5.

Figure 4:
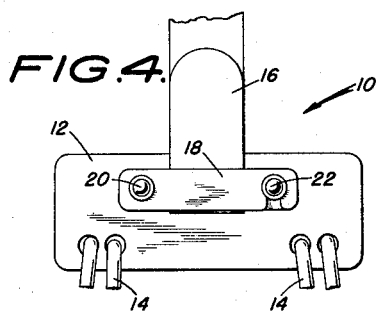
FIG. 4 is a view similar to FIG. 2 illustrating the secured and latched strap of the tire chain.
Figure 6:
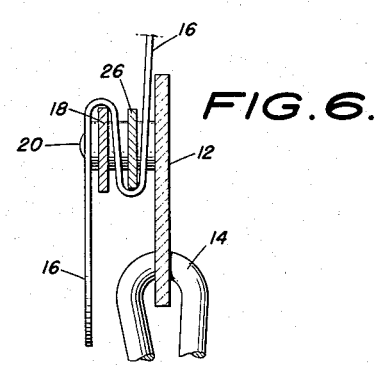
FIG. 6 is a vertical section taken along the line 6—6 of FIG. 1.

Now the latch 18 is closed as shown in FIG. 4 and the ends of strap 16 are bent downwardly over the latch 18 preventing it from opening as shown in FIG. 6.

It should be noted the spacing of the stud ends of the rivets 20 and 22 and the wide separation symmetrically thereabout of the points of suspension of the chains 14 prevents excessive twisting of the base plates 12 and hence occasions a minimum of flexing and fatigue to the metal strap 16.

In another embodiment of the emergency tire chain as designated by reference numeral 50 of FIG. 7, the pair of widely shaped cross chains 14 link together front and back base plates 52 and 72, respectively.

An inside lock 70 is provided for the back plate 72 which consists of a headed stud 74 which is riveted to the back plate 72 midway between the point of attachment of chains 14, and a keyhole 76 punched in a metal strap 56. The other end of strap 56 is punched at spaced intervals from its end with several elongated parallelly arranged ratchet slots 58.

The front base plate 52 is provided with an upper right angle flange 54 which has an aperture 55 provided therethrough through which is passed the ratchet slotted end of the strap 56.

A triangular ratchet cog 61 is secured by rivets 63 to the flange 54 of the base plate 52 with an intervening pad of rubber 62 therebetween. The pad of rubber 62 furnishes a resiliency for this ratchet cog 60 and normally holds it parallel to the base plate 52 as shown best in FIG. 8 with a tip 60 engaging one of the ratchet slots 58.

A bridge 64, having a passageway 65 is secured below the ratchet cog 61 to the base plate 52 and it serves to guide the end of strap 56 when it is tensioned in the direction of the straight arrow in FIG. 7.

A tool 69, such as a screwdriver, may be used against a projection 67 on the bridge 64 as a fulcrum. The end of tool 69 is inserted in one of the ratchet slots 58 and the handle end thereof is moved in the direction of the curved arrow. Great tension is thereby provided on the strap 56 of the tire chain 50, and as each ratchet slot 58 passes out from under tip 61 of the ratchet cog, the latter is forced outwardly only to fall into the next ratchet slot 58.

To release the tension on strap 56 of the tire chain 50 as when removing it from use, it is necessary to insert the tool 69 between the strap 56 and the ratchet cog 61, thus withdrawing the tip 60 from the engagement with the slots 58. The strap 56 can then be withdrawn from the base plate 52 and removed from the felloe of the wheel.

Obviously many modifications and variations of the present invention are possible in light of the above teachings. It is, therefore, to be understood that within the scope of the appended claims the invention may be practiced otherwise than as specifically described.

What is claimed is:

1. A tire chain device, comprising, a pair of substantially parallel and laterally spaced base members, a pair of removably mounted cross chains connecting said base members together at the one edge thereof, a flat elongated flexible metal strap member positioned intermediate said chains and having one end removably secured to the other edge of one of said base members, and adjustable latching means secured to the other base member of said spaced base members, said adjustable latching means including a plate swingable in a plane substantially parallel to the plane of said other base member for receiving and latching the other end of said flat elongated flexible metal strap member in doubled-up relationship to said other base member, with said flexible metal strap member being self conforming to a wheel felloe.

2. A tire chain device, comprising, a pair of substantially parallel and laterally spaced base members, a pair of chains connecting said base members together at corresponding edges thereof, a flexible metal strap member positioned intermediate said chains and having one end secured to one of said base members, and latching means including an adjustable ratchet element secured to the other base member of said spaced base members for receiving and latching the other end of said flexible metal strap member to said other base member with said flexible metal strap member being self conforming to a wheel felloe.

3. A tire chain device, comprising, a pair of substantially parallel and laterally spaced base members, a pair of removably mounted parallel spaced chains connecting said base members together at the one edge thereof, a flat elongated flexible metal strap member positioned intermediate said chains and having one end removably secured to the other edge of one of said base members, and adjustable latching means including a ratchet secured to the other base member of said spaced base members for receiving and latching the other end of said flat elongated flexible metal member to said other base member, with said flexible metal strap member being self conforming to a wheel felloe.

4. A tire chain device, comprising, a pair of substantially parallel laterally spaced flat base members, a pair of removably mounted substantially parallel spaced cross chains connecting said base members together at the lower edge thereof, a flat elongated flexible metal strap member, and adjustable latching means including a ratchet mechanism secured to said base members for receiving and latching the end of said flat elongated flexible metal strap member to said base members, with said flexible metal strap member being self conforming to a wheel felloe.

5. A tire chain device as recited in claim 4, wherein said flexible metal strap member is positioned intermediate said cross chains but on the opposite side of said base members from said chains.

6. A tire chain device as recited in claim 4, wherein one of said latching means secured to one of said base members is adjustable to receive an adjustable end of said flexible metal strap member.

References Cited in the file of this patent
UNITED STATES PATENTS

| | | |
|---|---|---|
| 2,223,824 | Helwig | Dec. 3, 1940 |
| 2,424,940 | Muise | July 29, 1947 |
| 2,461,737 | Huffman et al. | Feb. 15, 1949 |
| 2,638,953 | Mulholland | May 19, 1953 |
| 2,746,509 | Lang | May 22, 1956 |